US005582336A

United States Patent [19]

Kutnyak

[11] Patent Number: 5,582,336

[45] Date of Patent: Dec. 10, 1996

[54] HOLDING AND DISBURSEMENT DEVICE FOR IMPROVED PAGING AND HANDLING OF LETTER MAIL

[76] Inventor: Roxanne Kutnyak, S91 W22600 Fatima Dr., Big Bend, Wis. 53103

[21] Appl. No.: 413,858

[22] Filed: Mar. 29, 1995

[51] Int. Cl.$^6$ .......... B60R 9/00

[52] U.S. Cl. .......... 224/539; 224/543; 224/545

[58] Field of Search .......... 224/539, 543, 224/545, 555, 558, 564, 565, 566, 277, 570; 211/50, 51; 206/425, 451; 220/533, 534, 535, 536

[56] References Cited

U.S. PATENT DOCUMENTS

| | | | |
|---|---|---|---|
| 903,368 | 11/1908 | Flanders | 220/536 |
| 1,979,774 | 11/1934 | Scoville | 220/536 |
| 3,893,585 | 7/1973 | Morrison et al. | 220/536 |
| 4,907,707 | 3/1990 | Crum | 211/51 |

OTHER PUBLICATIONS

American Postal Supply Catalog, p. 153, DPS (Curbline Delivery) Mail Holder for LLV Vehicles #JRLLV101, Sep., 1994.

American Postal Supply Catalog, p. 154, DPS Elevator Trays, #APSDPS4010, Sep., 1994.

American Postal Supply Catalog, p. 155, Double Stack DPS Trays, #APSDPS2001, Sep., 1994.

Catalog Page with "Mail Lock Mail Trays", #45–4136 and #35–4135; and The Perfect Self Adjusting Mail Tray #TB7776B, Sep., 1994.

*Primary Examiner*—David J. Walczak
*Attorney, Agent, or Firm*—Quarles & Brady

[57] ABSTRACT

A letter tray is conveniently installed in a delivery vehicle that provides for improved paging and access to the envelopes contained therein. The tray is slightly uplifted along a leftmost open side to prevent the mail from falling out of the open side of the tray, in addition to aiding in facing the envelopes. A specially designed end panel allows for visibility of addresses and paging or bending of the letter mail for easy viewing of the next address in the bundle of mail. The tray is preferably made of a clear plastic material for a complete view of the envelopes. A back support member acts to hold the mail in place, even as envelopes are removed from the front of the stack. The back support member is angled backward to allow for partial separation at the top of the envelopes, while still securely holding the envelopes at the bottom.

19 Claims, 2 Drawing Sheets

HOLDING AND DISBURSEMENT DEVICE FOR IMPROVED PAGING AND HANDLING OF LETTER MAIL

BACKGROUND OF THE INVENTION

The field of the invention is trays for filing and stacking mail, including letters, small parcels, larger parcels and flat mail.

As the volume of mail and private shipping increases, there is an increasing need for auxiliary devices to aid delivery personnel in delivering letters and correspondence.

For the most part, delivery vehicles have been lacking in such devices except for some standard trays located behind the driver and along the interior sides of the vehicle. Delivery personnel are being required to handle stacks of various different kinds of mail. For example, one type of mail is D.P.S. (Delivery Point Sequence) mail, which is machine sorted and sequenced for delivery. Another type of mail is flat mail, including magazines and larger envelopes. Some mail cannot be treated as D.P.S. mail because it has been addressed by hand, is odd-sized, or is not properly coded for handling as D.P.S. mail. This results in three or more stacks of mail to be handled by a delivery person along with driving duties.

As items are delivered, it is typical for the delivery person to page through a stack of mail to retrieve mail for an address or a group of addresses. In some cases, the trays for holding this mail, are not constructed for mounting in the most convenient positions relative to the driver of a delivery vehicle. The driver/delivery person may be required to turn around too far and too often, and this becomes a cause of fatigue and loss of efficiency.

SUMMARY OF THE INVENTION

The invention relates to a letter holding and disbursement device that is conveniently installed in a delivery vehicle and provides for improved paging and access to envelopes contained therein.

The tray is slightly uplifted along a leftmost open side to prevent the mail from falling out. This uplifting also aids in aligning the bottom and right side edges of the mail.

A specially designed end panel allows for visibility of addresses and paging or bending of the letter mail for easy viewing of the next address in the bundle of mail. The tray is preferably made of a clear plastic material for a complete view of the envelopes. A back support member acts to hold the mail in place, even as envelopes are removed from the front of the stack. The back support member is angled backward to allow for partial separation at the top of the envelopes, while still securely holding the envelopes at the bottom.

In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
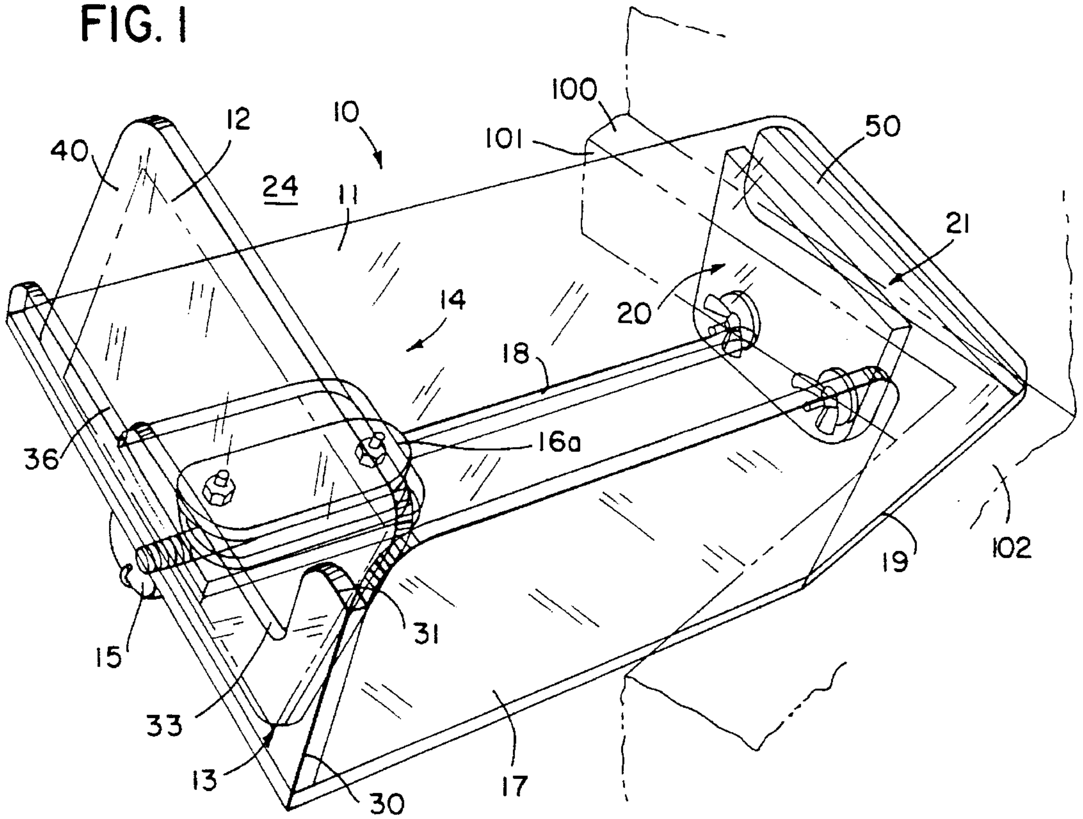
FIG. 1 is a perspective view of a preferred embodiment of the present invention for mounting in a front dashboard area of a delivery vehicle.

FIG. 1 shows a preferred embodiment 10 of the present invention for mounting in the front dashboard area of a delivery vehicle in a large open area between the instrument cluster area and the right side window. Inside the vehicle there is a front ledge 100, a fascia portion 101 depending from the front ledge 100 and a side ledge 102 running underneath the right side window.

Letter tray 10 is particularly suited for holding letter mail. The envelopes 12 (in phantom in FIG. 1) rest on base panel 11 which runs longitudinally alongside the side window of the vehicle on the right-hand side of the driver. Edge 19 of the tray 10 is angled at same angle as ledge 102.

A side panel 17 of suitable length and height extends along a side of the base panel 11 that is opposite from the driver's seat of the vehicle, when the device 10 is mounted in the vehicle, to hold the envelopes against sliding towards a sidewall of the vehicle. The side panel 17 also supports and aligns the right side edges of the envelopes and keeps them in a straight and orderly fashion. The alignment of the bottom and side edges of the envelope is sometimes referred to as "facing the mail".

The term "envelope" is used herein in a broad sense as any outer covering or container for the various types of mail which can be placed in tray 10. Thus, small parcels, such as boxes of bank checks, and small packages for computer disks might be stacked in such a tray, along with the typical letter mail. The term "envelope" shall be considered to be the outer covering or packaging for any type of mail that will fit within tray 10.

When conventional envelopes are used, the tray 10 will handle sizes from postcards, as well as size 6¾, 9, 10, 11, 12 and 14. The preferred embodiment can also be scaled up in size if it desires to handle 8½×11" envelopes and larger.

End panel 13 rises from the base panel 11 and faces towards the delivery person when the device 10 is mounted in the vehicle.

Figure 2:
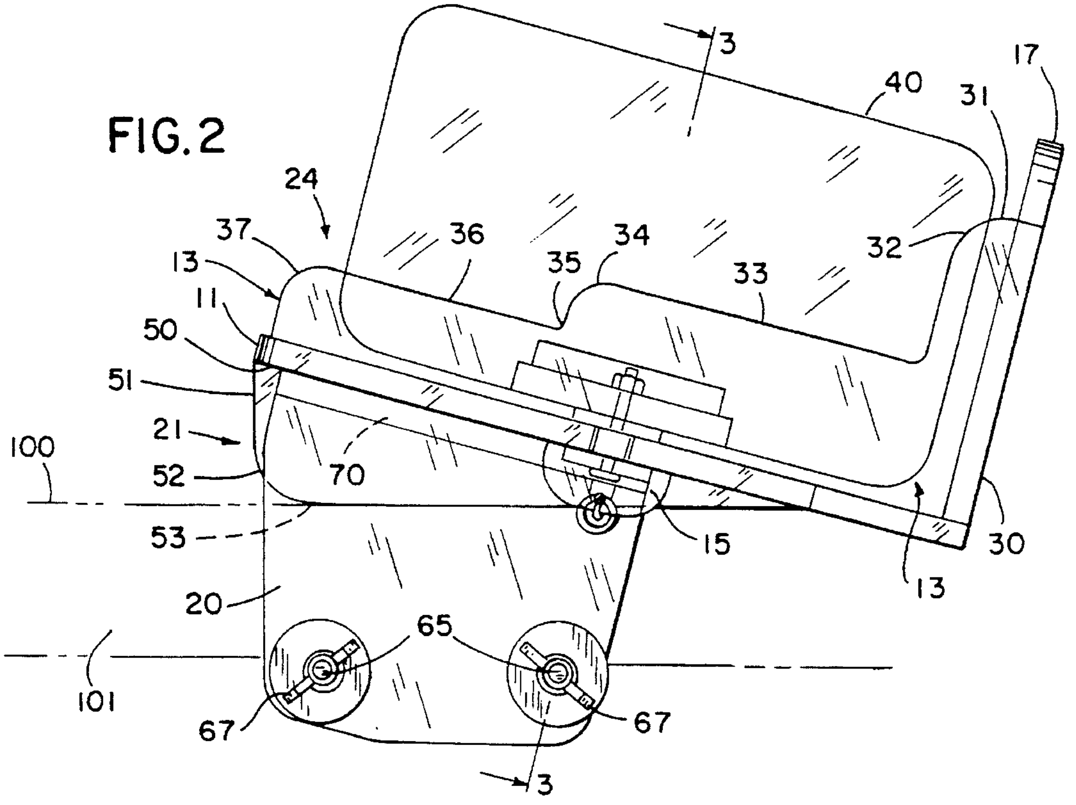
FIG. 2 is a front end view of the embodiment of FIG. 1.

At the other end, there is a first downwardly extending member 20 for mounting the device 10 to an interior member 100, 101 of the vehicle so as to extend longitudinally alongside a driver's seat in the vehicle. There is also a second member 21 underneath the base panel 11 for lifting up an open side 24 of the tray 10 to help face the mail and to prevent the mail from falling out. This second member 21 (FIG. 2) includes base edge 53, outside edge 51 and rounded corner 52 which are nearest the driver of the vehicle, and inclined edge 50 which provides a canting of the base panel 11 away from the driver to retain and face the envelopes in the tray in the lateral direction. The inclination of the tray 10 also allows for an extra amount of clearance between the tray 10 and the shift selector mounted on the steering column of the vehicle. The angle of canting is in the range of ten degrees to twenty degrees, and is preferably fifteen degrees with respect to ledge 100.

Members 11, 13, 17, 20, 21 and 40 (FIG. 1) are preferably made of a transparent plastic material for a complete view of the envelopes. One such known material is a transparent polycarbonate material commercially offered under the trademark Lexan® by General Electric Co. The plastic parts are adhesively secured to other plastic parts using a suitable adhesive.

Figure 3:
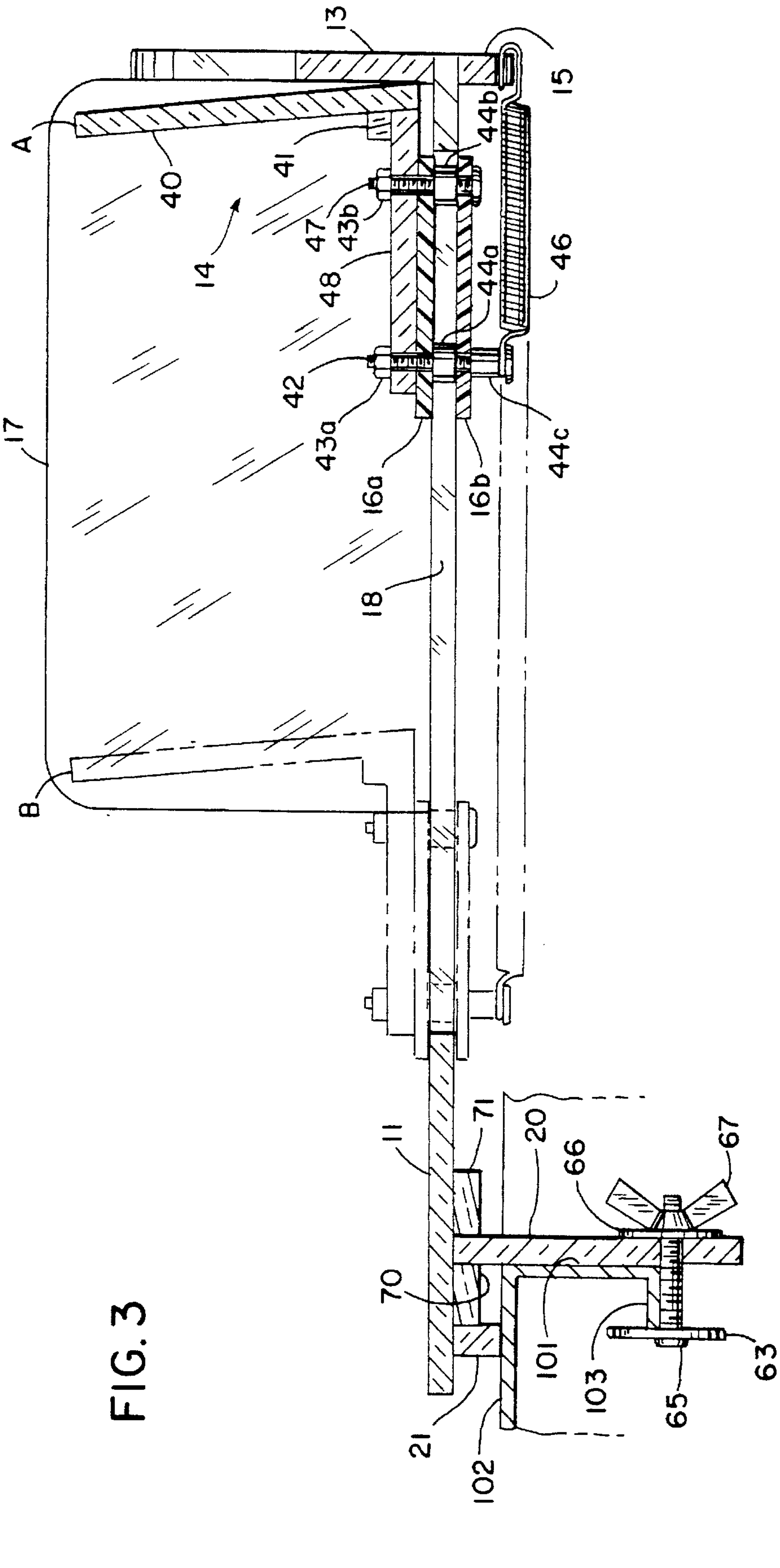
FIG. 3 is taken in the plane indicated by line 3—3 in FIG. 2 with a second position of parts shown in phantom.

A pusher assembly 14 slides in a longitudinally extending slot 18 in the base panel 11 towards the end panel 13 between a retracted position B and a forward position A seen in FIG. 3. As seen best in FIG. 3, pusher assembly 14 includes a base member 48 and a back support member 40 which is mounted at an angle of eighty degrees from base member 48, and ten degrees from perpendicular to the base member 48. While ten degrees is the preferred angle, it has been found that this feature of the invention will be provided with an angle of from five to fifteen degrees. Back support member 40 is mounted with the aid of support 41, which is adhered in place and which helps reduce the stress between the two pieces 40, 48 when the assembly 14 is pushed back to fill tray 10 with mail. As the mail is forced forward, the bottom half of the back support member 40 forces mail tight against the end panel 13, while the top half of the back support member 40 allows separation of the envelopes for paging.

The pusher assembly 14 includes two shim members **16*a*, 16*b* of a self-lubricating material such as a high density polypropylene or a tetraflouroethylene flurocarbon polymer, such as Teflon®, which are vertically spaced apart by ceramic bushings 44*a*, 44*b*. The round ceramic bushings 44*a*, 44*b* are slightly longer than the thickness of the base panel 11. Bushings 44*a*, 44*b* roll in slot 18 of the base panel 11 and are sandwiched between the two shim members 16*a*, 16*b*. These shims 16*a*, 16*b*, along with the extended length of the spacers 44*a*, 44*b*, allow the pusher assembly 14 to glide along an inside slot 18 and along the area on top and on bottom of base panel 11. The bottom shim 16*b* acts as a catch or stop that prevents the pusher assembly 14 from popping out of slot 18**.

The ceramic bushings **44*a*, 44*b* are mounted on bolts 42 and 47 (FIG. 3) which extend up through the members 16*a*, 16*b*, bushings 44*a*, 44*b* and base member 48, to be secured by hex nuts 43*a*, 43*b*. In addition, an additional bushing 44*c* is mounted on bolt 42 to space the head of bolt 42 below the pusher assembly 14 for holding one end of coiled tension spring 46. The other end of the coiled tension spring 46 is held in a position clearing the bottom of pusher assembly 14 by post 15 extending down from the end of the base panel 11 underneath the end panel. When the assembly 14 is pushed backward, the spring 46 is extended and when the intervening space is filled with mail, the back support member 40 compresses or forces the mail into the front end panel 13**.

End panel 13 (FIG. 2) extends along the front edge of the base panel 11. The envelopes 12 can be placed into tray 10 by pushing the back support member 40 back to position B in FIG. 3, filling the tray 10 and releasing the back support member 40. The mail envelopes 12 will then be urged forward against the end panel 13.

Tier 31 of the end panel 13 (FIG. 2), adjacent side member 17 at corner 30, provides suitable width and height to keep the envelopes 12 in a straight up and down position for the delivery person to observe the address and to page through the envelopes. Tier 33 provides a shorter height than that of the portion 31 of the end panel at corner 30, and tends to hold envelopes in the tray while extending underneath the address portion of shorter envelopes. Tier 36 extends laterally from second tier 33 to support larger envelopes. Tier 36 is of a shorter height then tier 33 to permit viewing the address portion of larger envelopes. Tier 36 also permits the delivery person to page and bend the letter mail over the lowest tier area to read the addresses on envelopes behind the first envelope. Also, if the end panel 13 is made of a transparent plastic, this aids in the visibility of the addresses. The corners 32, 34, 35 and 37 are rounded to prevent catching or tearing of the envelopes.

The far right side edge 19 (FIG. 1) of the letter tray 10 sits on the side ledge 102 next to the right side window. Member 20 fits against a fascia portion 101 of the front dash ledge. Members 20 and 21 are supported by cross pieces 70, 71 (FIG. 3). Bolts 65 fit through large washers 63 and are fastened with washer 66 using wing nuts 67 to clamp onto fascia 101 and inside lip 103 (FIG. 3). Thus, the front dash ledge 100, 101, 103 is clamped between the two sets of washers 63, 66 by the action of bolts 65 and wing nuts 67. This securely holds the unit 10 on ledges 100, 102.

It now should be apparent that the scope of the invention provides for devices that will aid a delivery person in the delivery of the mails, in holding stacked envelopes for convenient paging and retrieval.

This has been a description of how the invention may be carried out. Those of ordinary skill in the art will recognize that various details may be modified in arriving at other detailed embodiments, and that these embodiments will come within the scope of the invention.

Therefore, to apprise the public of the scope of the invention and the embodiments covered by the invention, the following claims are made.

I claim:

1. A device for holding and convenient handling of letter mail, the device comprising:

a base panel with means for mounting;

a side support rising from the base panel along a side of the base panel that is opposite an open side, to support envelopes having side edges and to align the side edges of said envelopes;

an end panel rising from the base panel along an end of the base panel to support said envelopes along lower front portions of said envelopes;

a back support member for said envelopes that advances towards said end panel; and means for urging the back support member towards said end panel to hold a stack of envelopes against said end panel; and wherein the means for mounting includes support means for canting the base panel away from an open side when the device is mounted in a vehicle to help hold the mail against falling out of an open side of the device, and thus facing the letter mail.

2. The device of claim 1, wherein the end panel is tiered with a first tier extending horizontally below an address portion of a first size of envelope and a second tier rising from the first tier at a corner where the end panel meets the side support.

3. The device of claim 2 wherein the end panel is made of a transparent plastic material.

4. The device of claim 2, wherein the second tier has a rounded corner leading towards the first tier and wherein the first tier has a rounded corner leading to the base panel.

5. A device for holding and convenient handling of letter mail, the device comprising:

a base panel with means for mounting;

a side support rising from the base panel along a side of the base panel that is opposite an open side, to support envelopes having side edges and to align the side edges of said envelopes;

an end panel rising from the base panel along an end of the base panel to support said envelopes along lower front portions of said envelopes;

a back support member for said envelopes that advances towards said end panel; and means for urging the back support member towards said end panel to hold a stack of envelopes against said end panel; and wherein the panel is three-tiered with a first tier extending horizontally below an address portion of a first size of envelope, a second tier extending horizontally below an address portion of a second size of envelope that extends longer in the lateral direction than said first size, and a third tier rising from the second tier at a corner where the end panel meets the side support.

6. The device of claim 5, wherein the third tier has a rounded corner leading towards the second tier and wherein the second tier has a rounded corner leading to the first tier.

7. The device of claim 6, wherein the end panel is made of a transparent plastic material.

8. The device of claim 7, wherein the transparent plastic material is a polycarbonate material.

9. The device of claim 5, wherein the end panel, the base panel and the side support are made of a transparent plastic material.

10. The device of claim 9, wherein the transparent plastic material is a polycarbonate material.

11. The device of claim 5, wherein the back support member is tilted back from perpendicular to the base panel, the back support member having a lower portion and an upper portion, such that the lower portion is urged more tightly against the envelopes, while the upper portion allows more separation between envelopes for paging and grasping.

12. The device of claim 11, wherein the back support member is tilted back at an angle of about ten degrees from perpendicular to the base panel.

13. A device for holding and convenient handling of letter mail, the device comprising:

a base panel with means for mounting;

a side support rising from the base panel along a side of the base panel that is opposite an open side, to support envelopes having side edges and to align the side edges of said envelopes;

an end panel rising from the base panel along an end of the base panel to support said envelopes along lower front portions of said envelopes;

a back support member for said envelopes that advances towards said end panel; and means for urging the back support member towards said end panel to hold a stack of envelopes against said end panel; and further comprising an angled support depending from an end of the base panel opposite the end panel for resting on a ledge in a vehicle and elevating an inside edge of the base panel nearer a driver relative to an opposite edge near a sidewall of the vehicle.

14. The device of claim 13, wherein the means for mounting includes a flange depending from an end of the base panel opposite the end panel and clamping means on said flange for secure attachment to an interior member of the vehicle, and wherein the base is adapted to rest on one or more interior ledges in the vehicle.

15. The device of claim 13, wherein the angled support provides an angle of tilt in the range of about five degrees to about fifteen degrees.

16. The device of claim 13, wherein base panel includes a slot therein extending in a longitudinal direction and wherein the back support comprises as assembly having a slider and a back support member mounted on the slider, and wherein the slider further comprises two spaced apart members of self-lubricating material and bushings which are arranged in said slot between said spaced apart members.

17. The device of claim 16, wherein the means for urging includes means for tensioning the back support member for movement towards the end panel.

18. The device of claim 17, wherein said means for tensioning is a coiled tension spring that is put into tension by the stacking of envelopes into a space between the back support member and the end panel.

19. The device of claim 17, wherein said means for urging includes means for spacing the coiled tension spring below the bottom panel to prevent binding of the spring.

* * * * *